(12) United States Patent
Preston

(10) Patent No.: US 7,686,352 B2
(45) Date of Patent: Mar. 30, 2010

(54) TUBING FOR A PLUMBING CONNECTION

(75) Inventor: Craig Avery Preston, Ypsilanti, MI (US)

(73) Assignee: Brass Craft Manufacturing Company, Novi, MI (US)

( * ) Notice: Subject to any disclaimer, the term of this patent is extended or adjusted under 35 U.S.C. 154(b) by 264 days.

(21) Appl. No.: 11/713,937

(22) Filed: Mar. 5, 2007

(65) Prior Publication Data

US 2008/0217918 A1    Sep. 11, 2008

(51) Int. Cl.
    *F16L 19/00* (2006.01)
(52) U.S. Cl. ............. 285/389; 285/382; 285/382.7
(58) Field of Classification Search ......... 285/247, 285/249, 354, 386, 389, 339, 341–343, 382, 285/382.7
    See application file for complete search history.

(56) References Cited

U.S. PATENT DOCUMENTS

| 1,518,778 | A | * | 12/1924 | Eastman | 285/238 |
| 1,718,817 | A | * | 6/1929 | Greene | 174/89 |
| 1,978,047 | A | * | 10/1934 | Haury | 277/622 |
| 2,250,517 | A | * | 7/1941 | Zolleis | 285/342 |
| 2,252,920 | A | * | 8/1941 | Edelmann | 285/341 |
| 2,935,339 | A | * | 5/1960 | Frederick | 285/4 |
| 3,254,908 | A | * | 6/1966 | Schlosser | 285/222.1 |
| 3,722,923 | A | * | 3/1973 | Grahl | 285/55 |
| 4,799,717 | A | * | 1/1989 | Kingsford | 285/341 |
| 5,024,419 | A | * | 6/1991 | Mulvey | 251/148 |
| 5,074,599 | A | * | 12/1991 | Wirbel et al. | 285/93 |
| 5,090,741 | A | * | 2/1992 | Yokomatsu et al. | 285/101 |
| 5,580,105 | A | * | 12/1996 | Miller, Jr. et al. | |
| 6,070,916 | A | * | 6/2000 | Rowley | 285/148.19 |
| 6,860,524 | B1 | * | 3/2005 | Rowley | 285/354 |
| 6,959,736 | B2 | * | 11/2005 | Jarvenkyla | 138/146 |
| 2002/0024220 | A1 | * | 2/2002 | Rowley | 285/354 |
| 2004/0045619 | A1 | * | 3/2004 | Backman et al. | 138/137 |
| 2008/0017268 | A1 | * | 1/2008 | Mahabir et al. | 138/141 |

FOREIGN PATENT DOCUMENTS

JP    06174156 A    *    6/1994

* cited by examiner

*Primary Examiner*—James M Hewitt
(74) *Attorney, Agent, or Firm*—Carlson, Gaskey & Olds

(57) ABSTRACT

Cross-linked polyethylene (PEX) tubing is utilized in a plumbing application for its strength and flexibility. A thin outer layer is formed around the PEX layer to provide a variety of color choices for the final tubing. The use of a softer material for the outer layer provides the unexpected benefit of a more secure connection as a standard connector having a ring is able to dig into the outer layer and provide a more secure grip and an improved hydraulic sealing.

10 Claims, 2 Drawing Sheets

TUBING FOR A PLUMBING CONNECTION

BACKGROUND OF THE INVENTION

This application relates to a plumbing connection utilizing cross-linked polyethylene tubing, having an outer coating of a softer material which facilitates the grabbing ability of a connector ring and an improved hydraulic seal.

Plumbing connections have historically been provided by pipe. As one standard connection, a shut-off valve in a wall is connected to a faucet or other plumbing component through some form of fluid conduit (traditionally, rigid pipe). More recently, it has been found desirable to use flexible tubing, and in particular cross-linked polyethylene (PEX) tubing has been proposed. PEX tubing has good strength and flexibility, and thus would have benefits for these plumbing applications.

However, PEX is only available in a limited range of colors. It would be desirable to have tubing available in a greater variety of colors. Moreover, the PEX tubing is challenging to connect.

SUMMARY OF THE INVENTION

In the disclosed embodiment of this invention, PEX tubing is provided with an outer covering of a softer material. In particular, polyethylene is provided as the outer layer. The polyethylene is available in a wide variety of colors, and thus can provide the tubing in a color that can be tailored as desired.

An unexpected benefit of this outer coating is that when a standard connection utilizing a compression nut and a ring is utilized, the ring is able to dig into the softer outer coating, and grab the tubing to a greater degree than the uncoated PEX coating. Additionally, the pliable nature of the softer outer coating provides an improved hydraulic seal between the ring and the tubing.

These and other features of the present invention can be best understood from the following specification and drawings, the following of which is a brief description.

DETAILED DESCRIPTION OF THE PREFERRED EMBODIMENT

Figure 1:
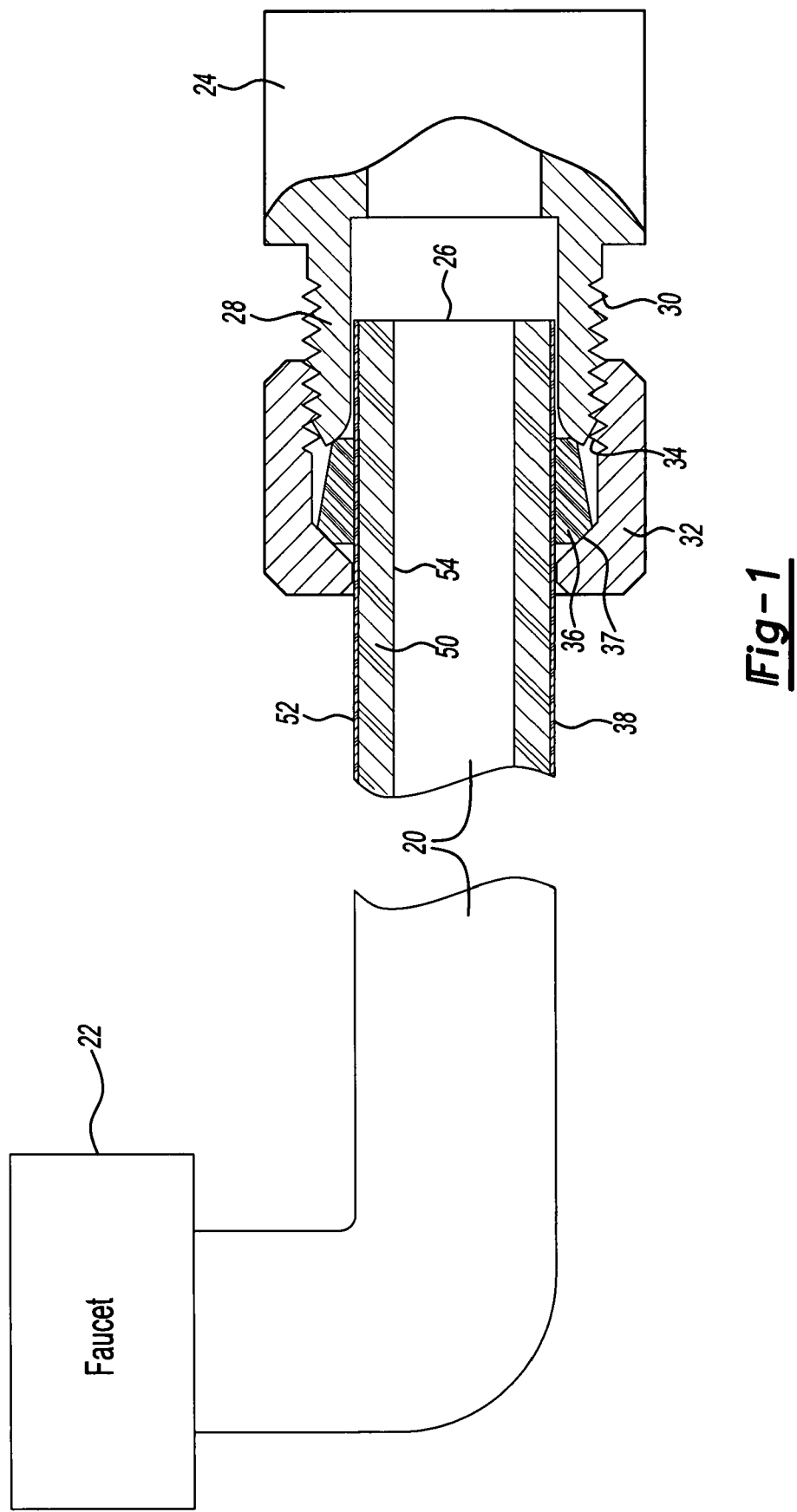
FIG. 1 is a view of a plumbing connection.

FIG. 1 shows a plumbing connection, connecting a plumbing device, such as a faucet 22, through a tubing 20 to a wall valve 24. As known, the wall valve 24 has a threaded connection portion 28 with screw threads 30 receiving a compression nut 32. An end 26 of the tubing 20 is received within this threaded portion 28. As the nut 32 is tightened, its screw threads 34 turn on screw threads 30. An angled face 37 cams a ring 36 inwardly to grip the tubing 26.

Figure 2:
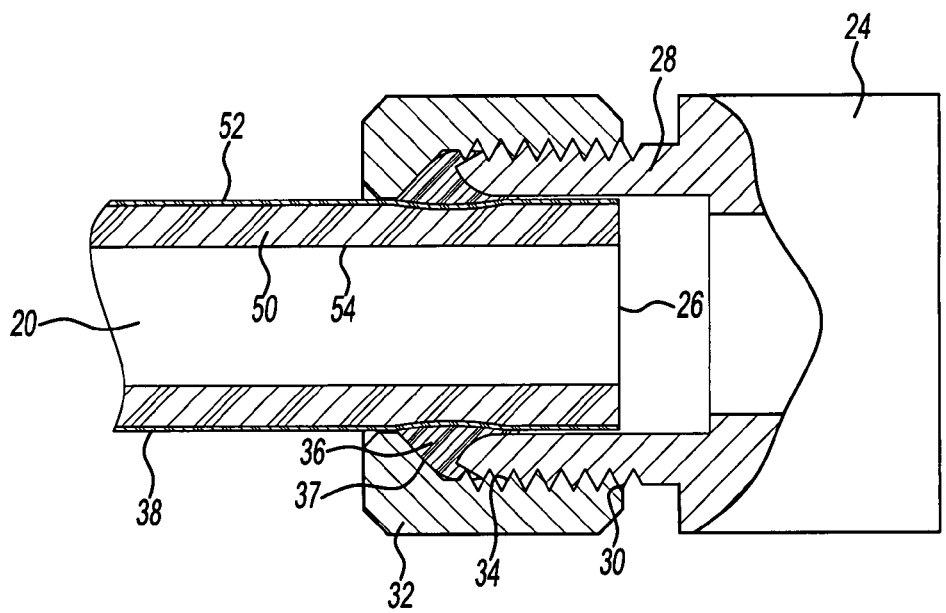
FIG. 2 shows the tightened connection.

As shown in FIG. 2, the ring 36 is forced into an outer coating on the outer periphery 38 of the tube 20. The amount of "grabbing" may be somewhat exaggerated to illustrate the fact of the grabbing. Ring 36 may be Delrin, an engineering plastic polymer, although other materials may be used.

This grabbing is an unexpected benefit of the softer outer coating.

Figure 3:
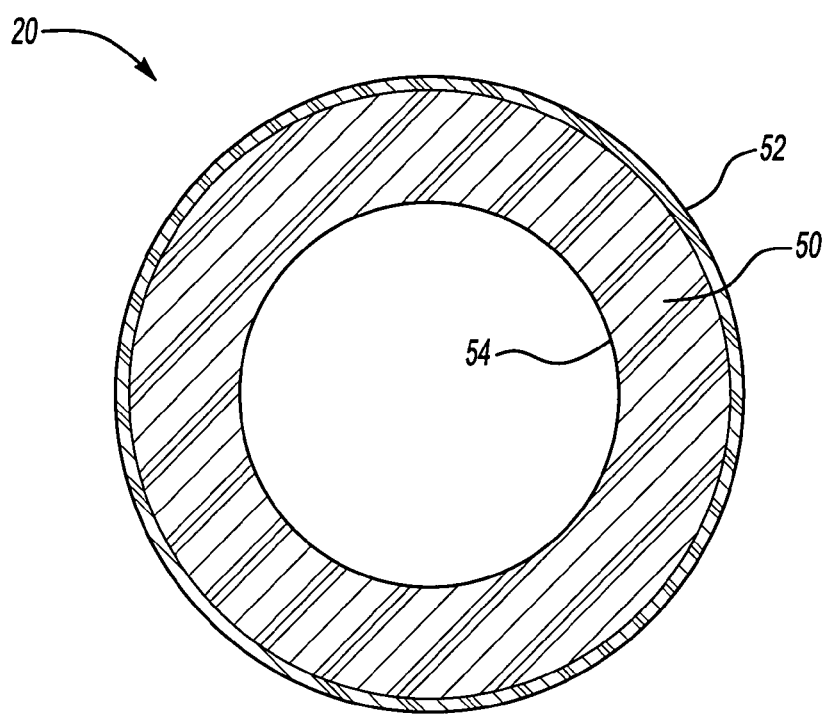
FIG. 3 is a cross-sectional view through the inventive tubing.

FIG. 3 shows the tubing 20. As shown, an inner PEX portion 50 extends over the great majority of the thickness of the tube from the inner bore 54. A thin outer coating 52 is formed of a softer material, and in a disclosed embodiment, polyethylene. The outer cover 52 can be formed in grey, chrome, brass, nickel, and other colors. That is, both portions 50 and outer cover 52 are formed of a polymer.

In one disclosed embodiment, the thickness of the PEX layer 50 may be between 0.062-0.067". In the same tube, the thickness of the outer layer was between 0.004 and 0.007". Thus, the outer coating is less than 50% of the thickness of the PEX layer, and in disclosed embodiments, less than 20% of the thickness.

The present invention thus provides a tubing having the benefits of the PEX layer, but which can also be formed in a variety of colors. Moreover, the invention has the unexpected result of providing a tube which is gripped more securely by standard connectors and produces an improved hydraulic seal.

While an embodiment has been disclosed, a worker of ordinary skill in this art would recognize that certain modifications would come within the scope of this invention. For that reason, the following claims should be studied to determine the true scope and content of this invention.

What is claimed is:

1. A plumbing connection comprising:
   a nut to be secured on a threaded fixture for a plumbing connection;
   a ring to be forced inwardly as said nut is tightened on a threaded fixture;
   a tubing received within said nut and said first member, and said ring digging into said tubing as said nut is tightened, said tubing being formed of an inner layer formed of a first material, and an outer peripheral layer formed of a second material softer than said first material;
   said outer peripheral layer having a thickness that is less than 20% of a thickness of said inner layer;
   said ring, said first material and said second material all being polymers.

2. The plumbing connection as set forth in claim 1, wherein said outer peripheral layer is polyethylene.

3. The plumbing connection as set forth in claim 1, wherein said inner layer is cross-linked polyethylene.

4. The plumbing connection as set forth in 1, wherein said nut and said ring have mating angled surfaces such that said ring is cammed into said outer peripheral layer of said tubing as said nut is tightened on said first member.

5. The plumbing connection as set forth in claim 1, wherein said thickness of said inner layer is between 0.062 and 0.067", and the thickness of the outer layer is between 0.004 and 0.007".

6. A plumbing connection comprising:
   a first member having a threaded portion for receiving a nut;
   a nut to be secured on said first member;
   a ring forced inwardly as said nut is tightened on said first member;
   a tubing received within said nut and said first member, and said ring digging into said tubing as said nut is tightened on said first member, said tubing being formed of an inner layer formed of a first material, and an outer peripheral layer formed of a second material softer than said first material;
   said outer peripheral layer having a thickness that is less than 20% of a thickness of said inner layer; and
   said ring, said first material and said second material all being polymers.

7. The plumbing connection as set forth in claim 6, wherein said outer peripheral layer is polyethylene.

8. The plumbing connection as set forth in claim 7, wherein said inner layer is cross-linked polyethylene.

9. The plumbing connection as set forth in claim 6, wherein said nut and said ring have mating angled surfaces such that said ring is cammed into said outer peripheral layer of said tubing as said nut is tightened on said first member.

10. The plumbing connection as set forth in claim 6, wherein said thickness of said inner layer is between 0.062 and 0.067", and the thickness of the outer layer is between 0.004 and 0.007".

* * * * *

UNITED STATES PATENT AND TRADEMARK OFFICE
CERTIFICATE OF CORRECTION

PATENT NO. : 7,686,352 B2  Page 1 of 1
APPLICATION NO. : 11/713937
DATED : March 30, 2010
INVENTOR(S) : Craig Avery Preston It is certified that error appears in the above-identified patent and that said Letters Patent is hereby corrected as shown below:

Claim 1, column 2, line 29: "first member" should read as --threaded fixture--

Claim 4, column 2, line 42: insert --claim-- between "in" and "1"

Claim 4, column 2, line 45: "first member" should read as --threaded fixture--

Signed and Sealed this

Fifteenth Day of June, 2010

David J. Kappos
*Director of the United States Patent and Trademark Office*